March 2, 1943.     I. JEPSON     2,312,555
COFFEE MAKER
Filed Oct. 27, 1938     4 Sheets-Sheet 1

Inventor:
Ivar Jepson
By
McCanna, Wintercorn & Morsbach
Attys.

March 2, 1943.  I. JEPSON  2,312,555
COFFEE MAKER
Filed Oct. 27, 1938  4 Sheets-Sheet 3

March 2, 1943.     I. JEPSON     2,312,555
COFFEE MAKER
Filed Oct. 27, 1938     4 Sheets-Sheet 4

Inventor:
Ivar Jepson
By McCanna, Wintercorn & Morsbach
Attys.

Patented Mar. 2, 1943

2,312,555

UNITED STATES PATENT OFFICE 2,312,555

COFFEE MAKER

Ivar Jepson, Chicago, Ill., assignor to Chicago Flexible Shaft Company, Chicago, Ill., a corporation of Illinois Application October 27, 1938, Serial No. 237,247

26 Claims. (Cl. 219—43)

This invention relates to coffee makers, and has special reference to coffee makers such as the vacuum type wherein water is heated in one container and transferred to another and returned during the making operations.

An important object of the invention is the provision of a coffee maker having improved control means to control and to terminate the coffee making operations without the attention of the operator during the making operations and at the close thereof, and wherein the coffee is maintained in a heated condition until desired and during the serving thereof.

A further object of the invention is the provision of a vacuum type coffee maker having improved means arranged to produce a high heat in the pot to transfer the water to the coffee container and to thereafter maintain a low heat therein to cause the liquid to return to the pot and to keep the coffee liquor thus produced in a heated condition.

A further object is to provide what may be termed an automatic coffee maker, which will function automatically to perform the coffee making operations and to keep the coffee at a desired temperature for serving. In this connection my invention aims to control the timing of the coffee making functions, regardless of the number of cups of coffee being made, to the end that uniformly delicious coffee will be produced without need of the housewife or operator keeping watch over the device to perform some manual operation in the nature of timing, or adjusting, or preventing recurrence of the coffee making process.

A further object is to provide a coffee maker of the character described which will be of simple construction and economical to manufacture considering the functions performed, and which will serve in a practical and satisfactory manner the purposes intended.

A further object is to provide a coffee maker adapted for automatically making coffee and keeping it at a desired serving temperature, characterized by the use of a single heating element controlled by a single thermostat, the latter of which functions in different temperature ranges to effect heater control operations. I have also aimed to provide a single set of contacts in the heater circuit for "on" and "off" operation controlled by a first and a second contact operator to effect the desired coffee making and keeping functions in response to the thermostat.

A further object is to provide a coffee maker having an improved pot, particularly in respect to the construction and association of the heating element therewith to obtain comparatively quick heat exchange and to prevent warpage or distortion of the heating element and the pot, and to permit of quick and easy installation of the heating element as well as replacement thereof.

A still further object of the invention is the provision of a coffee maker having an improved coffee container bowl.

Another object of the invention is the provision of a coffee maker having improved thermostat switch mechanism.

Other objects and advantages will appear from the following description and the accompanying drawings, in which—

Figures 1, 2:
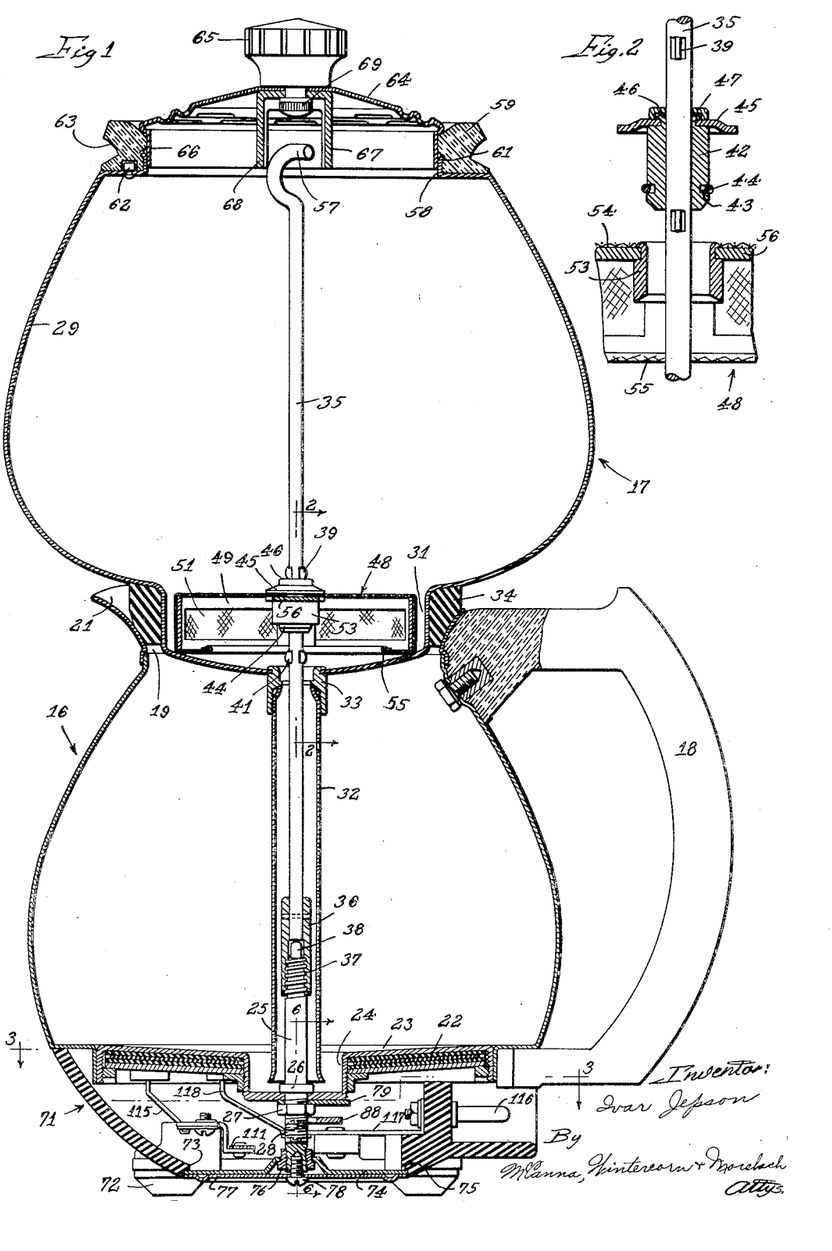
Figure 1 is a vertical section through a coffee maker embodying the invention.
Fig. 2 is a fragmentary section through the filter mechanism on the line 2—2 of Figure 1.

The invention is directed primarily to vacuum type coffee makers and others operating on analogous principles, that is, by the displacement of water from the coffee pot into another container or another section of the container and its subsequent return to the pot. There are, however, certain phases of the invention which may not be limited to such construction. The device herein shown for purpose of illustration is a vacuum type coffee maker having a heating or coffee pot indicated generally by the numeral 16 and a coffee container or bowl designated generally by the numeral 17. In this instance the pot and bowl are of metal, but the invention is obviously not limited to this type of construction. The pot 16 has a handle 18 and an open top 19 surrounded by a pouring lip and spout 21 so that the pot may serve in the serving of coffee. The open top of the pot in the serving function thereof may be covered by a closure, as will presently be described. The bottom of the pot carries a heating element 22 and is sloped slightly, as shown at 23, toward a central well 24. Positioned in the bottom of the well 24, and substantially at its center is an upstanding stud 25 having a flange 26 bearing against the bottom of the well and a nut 27 on the exterior of the container engaging a lower threaded portion 28 of the stud to secure the same in position in the pot.

The bowl 17 consists of a symmetrical portion 29 having a bottom well 31 terminating in a displacement tube 32, the interior of which communicates with the interior of the bowl. The tube 32 is advantageously threaded into a threaded boss 33 carried in the bottom of the well 31 so as to be removable for cleaning purposes. The tube 32 terminates at its lower end within the well 24 of the pot below the level of the main body thereof and preferably below the level of the heating element 22, and serves to conduct water from the interior of the pot 16 upward into the bowl when displaced by steam pressure within the pot. A rubber or similar gasket 34 is positioned around the exterior of the well 31 and is shaped to seat in the open top of the pot 16, as best shown in Figure 1 for the purpose of producing a steam-tight joint between the bowl and the pot. For the purpose of fixedly securing the bowl and the pot together, compressing the gasket 34, and retaining the filter in place, a rod 35 is provided of a length to extend from the upper end of the bowl 17 to a point adjacent the lower end of the pot 16, as shown in Figure 1. The lower end of the rod 35 has an internally threaded sleeve 36 adapted to engage threads 37 on the upper end of the stud 25, the upper end of the stud having a pilot point 38 for guiding the sleeve into engagement with the threads 37. Intermediate its ends the rod is provided with spaced abutments 39 and 41 between which is slidably positioned on the rod a collar 42. The collar has an annular groove 43 within which is seated a split ring 44, and spaced therefrom adjacent the opposite end of the collar 42 is an annular flange 45, a portion of the collar being spun over as shown at 46 to secure the flange in place. A washer 47 likewise loose on the rod 35, is positioned between the collar 42 and the abutment 39 for the purpose of facilitating the rotation of the rod with respect to the collar 42.

Figures 3, 4, 5, 6:
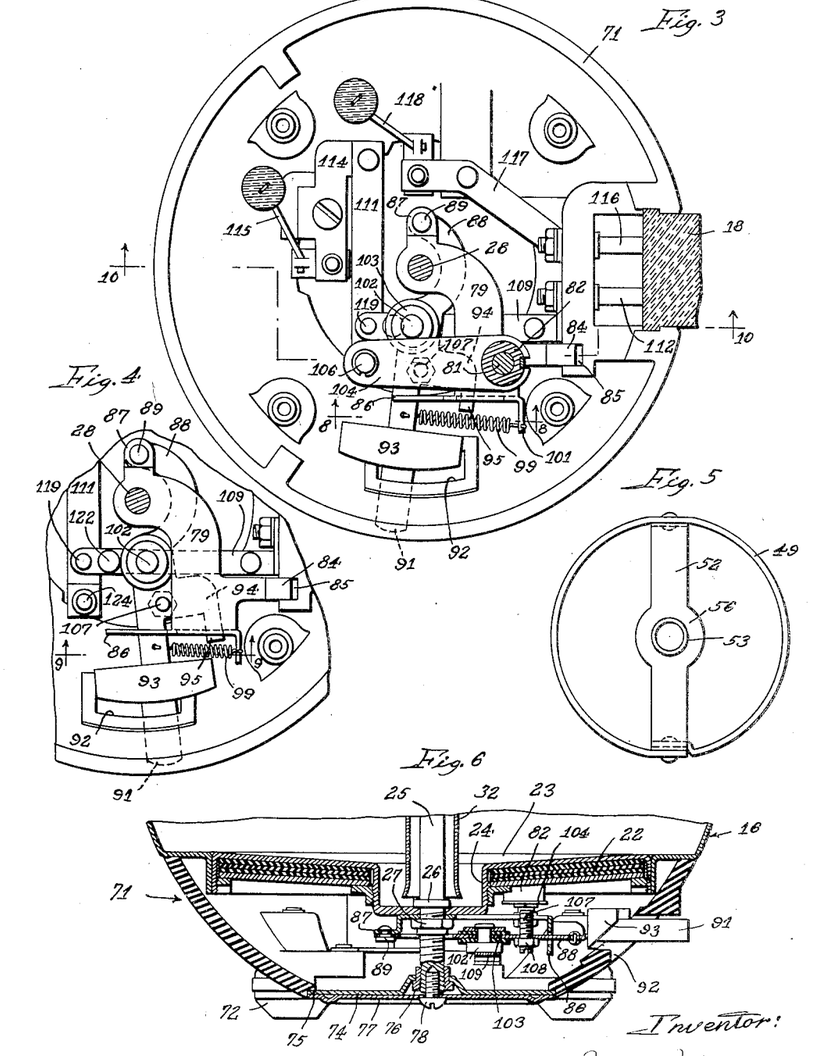
Fig. 3 is a view on the line 3—3 of Figure 1.
Fig. 4 is a fragmentary view similar to Fig. 3 showing the moved position of the switch mechanism.
Fig. 5 is a top view of the strainer frame.
Fig. 6 is a section substantially on the line 6—6 of Figure 1.
Figure 7:
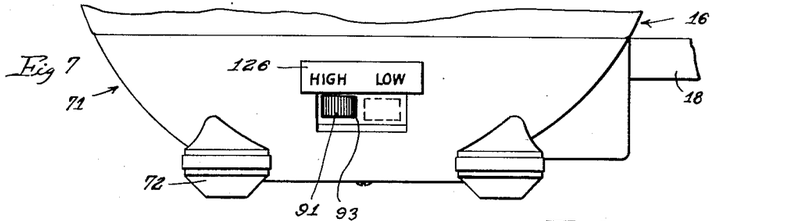
Fig. 7 is a fragmentary side elevation of the coffee pot showing the bottom thereof and associated switch mechanism.

The collar 42 and associated parts serve to support a filter and filter frame designated generally by the numeral 48. This consists of a disk-like structure having cylindrical side walls 49 provided with peripheral slots 51 and a transverse member 52 extending diametrically between the cylindrical side walls, the transverse member having an axial opening within which is fixedly secured a cylindrical supporting element 53, the interior diameter of which is such as to closely receive the collar 42. The distance between the split ring 44 and the flange 45 is slightly greater than the length of the cylindrical supporting member 53 so that when the collar is received therein, the flange 45 rests against the upper face of the frame, and the split ring 44 rests against the lower end of the cylindrical member 53, thus retaining the filter frame in position on the collar but permitting rotation of the rod with respect to the frame and also rotation of the rod with respect to the collar 42. The frame is covered by a filter cloth 54 of conventional material in the form of a disk, the peripheral edges of which are gathered below the frame by means of a drawstring or the like, as shown at 55. The filter cloth has a central opening for the passage of the collar 42 therethrough but of such size that the flange 45 engages the periphery of the opening and binds it against an enlarged portion 56 of the transverse frame member 52, as will be seen from Figs. 2 and 5. The upper end of the rod 35 is bent transversely of its length as shown at 57 in the plane of the upper end of the bowl 17 through which the rod 35 is rotated. From this structure it will be seen that when the bowl 17 is positioned on the pot 16, the rod 35 with the attached filter may be inserted through the top of the bowl 17, the sleeve 36 passing down through the tube 32 into engagement with the upper end of the stud 25. Thereupon rotation of the rod 35 causes the rod to move downward so that the shoulder 39 engages the washer 47, the washer 47 engages the flange 45, the flange 45 engages the filter cloth and frame, and the periphery of the frame and cloth engages against the bottom of the well 31. The rod 35 is rotated until the parts are drawn up tightly, thus compressing the gasket 34 and rigidly securing the parts in position. Because of the manner in which the filter and filter frame are removably secured to the rod 35, the cloth is easily removed for cleaning or replacement and the parts are easily disassembled for access to all parts of the device during the cleaning operation.

The upper end of the bowl 17 has a top opening 58 which is provided with an annular ring 59 of insulation material such as a molded plastic material secured in position by a vertically disposed flange 61 of the bowl and a pin 62. The ring 59 may advantageously be provided with an annular groove 63 for the purpose of producing a gripping surface for the fingers of the operator in removing the bowl from the pot. A closure member 64 having a knob 65 of insulation material and a depending flange 66 is adapted to seat in the open top of the bowl, the open top being of substantially the same size as the open top 19 of the pot so that the closure 64 may be interchangeably used on the bowl and on the pot. A channel member having depending flanges 67 and 68 is axially positioned on the lower side of the closure 64 by means of a screw 69 or otherwise, the flanges 67 and 68 being of such depth as to rest within the plane of the end 57 of the rod 35 so that upon rotation of the closure 64 the rod 35 may be rotated by contact with the flanges 67 and 68. Through this means at the conclusion of the coffee making operations, the operator may disengage the rod 35 from the stud 25 by rotation of the knob 65 and remove the bowl from the pot by grasping the ring 59. In this way it is unnecessary for the operator to come into contact with heated portions of the device for the purpose of disengaging the rod 35 and removing the bowl.

Directing attention now more particularly to the structure for controlling the operation of the coffee maker, the pot 16 has a base designated generally by the numeral 71, formed in this instance of insulation material such as a molded plastic and having legs 72 for supporting the pot to provide ventilation below the same. The lower side of the base has an opening 73 closed by means of a plate 74 which abuts against a shoulder 75 of the base at its periphery. The center of the plate is drawn upward by means of a nut 76 engaging the threaded portions 28 of the stud 25, thereby securing the base to the bottom of the pot. The plate 74 and the nut 76 are covered by a decorative plate 77 held in place by a screw 78 threaded into the end of the stud 25.

Within the base 71 is a bracket 79 through which the stud 25 passes, the bracket being secured against the bottom of the well 24 by means of the nut 27. The bracket is also secured against the bottom of the pot on a screw 81 threaded onto a sleeve 82 attached to the bottom of a pot and extending through the heating elements 22, spaced nuts 83 securing the bracket in place thereon. The bracket has a laterally extending finger 84 interfitting with a slot 85 of the base to locate the base with respect to the bottom of the pot. At one end of the bracket 79 is a depending flange 86 and at the opposite end thereof is a laterally extending ear 87 between which is supported a switch actuating lever 88. The switch actuating lever is pivotally secured to the ear 87 by means of a pin 89 and projects laterally outward in somewhat parallel relation with the bracket 79, terminating in a finger actuated button 91. The finger button 91 extends through a slot 92 in the base and has a guard member 93 adapted to cover the slot 92 regardless of the rotative position of the button, as will be apparent from Figs. 3, 4, 6 and 7. The lever 88 is forked intermediate its ends, as shown at 94, to provide a finger 95 which projects through a slot 96 in the flange 86 of the bracket 79 and thus serves to limit the movement of the lever 88 as well as to prevent excessive lateral movement of the lever. The lever 88 has a substantial degree of lateral movement with respect to the pivot pin 89 for a purpose presently to be discussed. The lever 88 also projects through a slot 97 in the flange 86 which slot has a shoulder 98 along its upper edge between the ends thereof. The lever 88 is normally urged in a counter-clockwise direction facing Figs. 3 and 4 by means of a spring 99 acting between a laterally disposed finger 101 on the flange 86 and the lever 88, the spring being tensioned so that when the knob 91 and lever 88 are moved in a clockwise direction facing Figs. 3 and 4, the edge of the lever 88 may be engaged behind the shoulder 98 and will remain in this position under the tension of the spring, and also so that when the lever is moved downward free of the shoulder 98, the spring will draw the lever in a counter-clockwise direction from the position shown in Fig. 8 to that shown in Fig. 9. A cam member 102 is secured on the switch actuating lever 88 intermediate its ends and is insulated therefrom by layers of mica 103.

Figure 8:
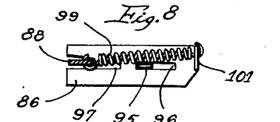
Fig. 8 is a section on the line 8—8 of Fig. 3.
Figure 9:
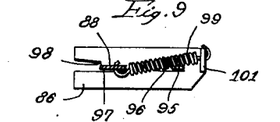
Fig. 9 is a section on the line 9—9 of Fig. 4.

The lever 88 is caused to move from the position shown in Fig. 8 to the position shown in Fig. 9 by a temperature responsive element, in this instance a bimetallic strip 104. One end of the strip or blade 104 is secured in face contact against the end of the sleeve 82 by means of the screw 81, a nut 105 thereon pressing the surface of the blade against the end of the sleeve in such manner that the temperature of the bottom of the pot would be transmitted through the sleeve 82 to the temperature responsive blade 104 so that this blade will to a substantial degree correspond with the temperature on the bottom of the pot. The free end of the blade carries a block of insulation 106 for a purpose which will presently appear. A screw 107 is adjustably secured in the lever 88 in a position to be engaged by downward warping of the thermostatic blade 104, the screw being threaded into the lever and secured in fixed position by a nut 108 in order to adjust the point at which it will be engaged by the thermostatic blade, and consequently the temperature at which the blade will engage thereagainst. When the blade comes into engagement therewith, continued heating of the blade and the warpage incident thereto causes the screw and the lever 88 to be moved downward and at a predetermined point the lever will move free of the shoulder 98 and will be rotated to the position shown in Fig. 9 under the action of the spring 99.

Figures 10, 11:
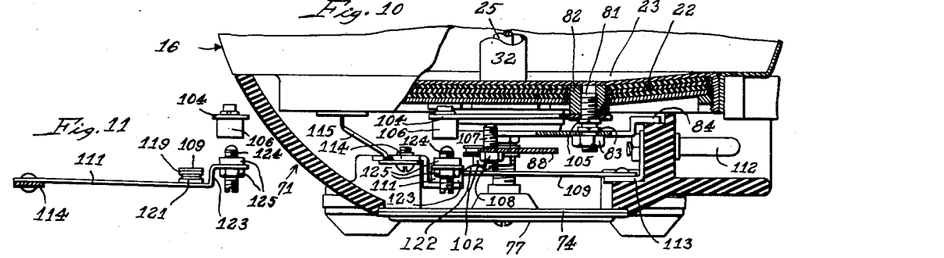
Fig. 10 is a section on the line 10—10 of Fig. 3 showing the parts in the cold position.
Fig. 11 is a view of the switch mechanism in the cold position taken substantially on the line 11—11 of Fig. 12.
Figure 12:
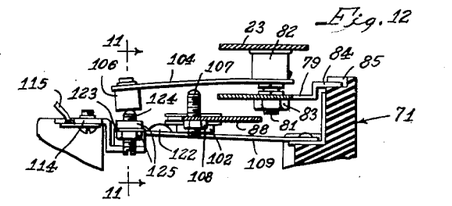
Fig. 12 is a fragmentary view similar to Fig. 10 showing the parts immediately after the termination of the high heating phase of the coffee making operation.
Figure 16:
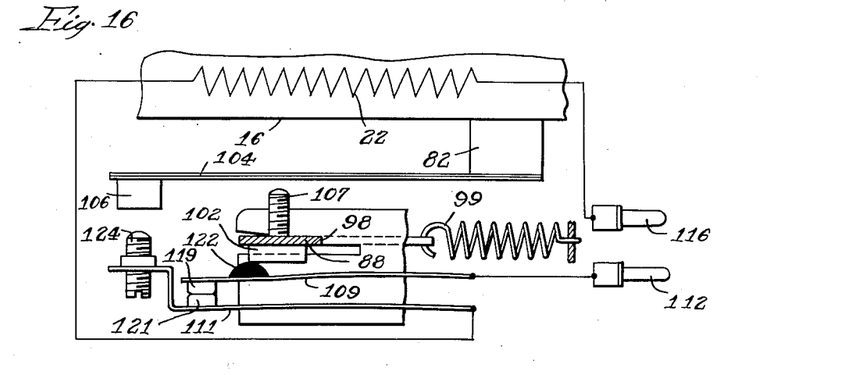
Fig. 16 is a diagrammatic view illustrating operation of the thermal switch in the heater circuit, showing the parts in the cold condition and with the lever 88 moved to the latched or "high" position.
Figure 17:
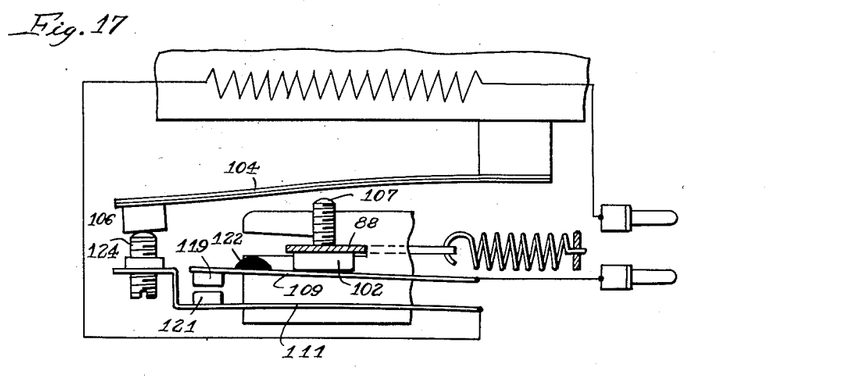
Fig. 17 is a similar view showing the thermal-responsive member moved to open the heater circuit in response to a predetermined high temperature, and showing the lever 88 unlatched to the "low" position.
Figure 18:
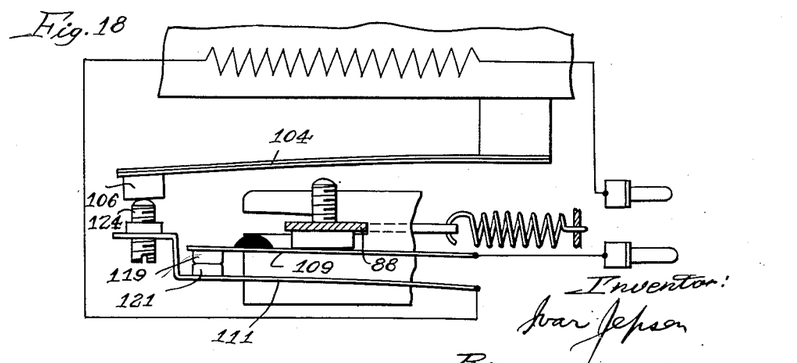
Fig. 18 is a similar view showing the thermal-responsive member moved in the opposite direction in response to cooling and thereby causing the heater circuit to be closed.

A pair of spring pressed contact carrying blades are carried on the base member 71, and designated by the numerals 109 and 111, the carriers extending at right angles to each other and overlapping adjacent their free ends. The contact carrier 109 is connected to a terminal pin 112 by means of a conductor 113 while the contact carrier 111 is connected to one terminal element of the heating element 22 through conductors 114 and 115. The second terminal pin 116 is connected to the other terminal of the heating element 22 by means of conductors 117 and 118, from which it will be seen that opening and closing of contacts 119 and 121 on the carriers 109 and 111, respectively, function to open and close the circuit through the heating element 22. The carriers 109 and 111 are spring pressed upward so that the contact 121 is normally pressed against the contact 119 and so that the carrier 109 is pressed against the cam button 102, which button limits the upward movement of the carrier 109, as shown in Fig. 10 and best shown in Fig. 16. The carrier 109 has a cam button 122 so positioned as to engage the cam member 102 when the lever 88 occupies the cocked or latched position shown in Figs. 8, 10 and 16. When the lever 88 moves to the position shown in Fig. 9, the cam member 102 is moved laterally from the position shown in Figs. 10 and 16 to the position shown in Figs. 12 and 17, so that the cam member 102 is out of registration with the button 122. The free end of the spring blade 111 is bent upwardly as shown at 123 and carries an adjustable pin 124 having lock nuts 125 for securing the same in position. The pin 124 is positioned to be contacted by the insulation block 106 carried on the thermostatic blade 104.

Figure 13:
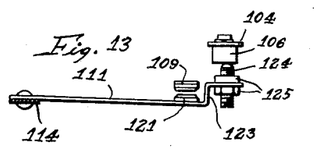
Fig. 13 is a view of the switch mechanism with the parts in the position shown in Fig. 12 and taken on the line 11—11.
Figure 14:
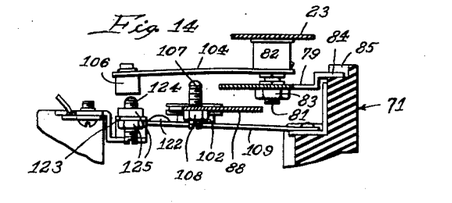
Fig. 14 is a view similar to Fig. 12 showing the parts in the low temperature control position.
Figure 15:
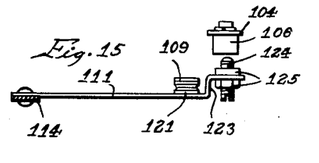
Fig. 15 is a view of the switch mechanism corresponding to Fig. 14.

From the foregoing it will be observed that I have provided a single electric heating element 22 in a circuit controlled by a single switch having contacts 119 and 121. The heating element shown is designed for about 1000 watts and because of its arrangement covering substantially the entire bottom of the pot and its intimate heat conducting relation thereto it serves to provide quick heat exchange to the pot and to heat the water to the desired high temperature in a comparatively short time. This quick heat exchange is an important factor in obtaining the desired temperature and time control functions hereinafter described. The time and temperature functions depend on the closing and opening of the contacts and these operations are controlled by the single thermostat which is so located and connected to the bottom of the pot as to closely follow temperature changes thereof. The structure is designed so that the contacts 119—121 are normally closed by reason of the spring tension in the members 109 and 111. It will now be observed that I have provided two operators for opening the contacts 119—121 and that each contact operator is arranged to be actuated by the single bimetallic strip or blade 104 in a temperature control operation different from the other. More particularly, the first contact operator is actuated in one temperature range by the thermostat for control of the coffee making function and the second contact operator is actuated in another temperature range by the same thermostat for control of the coffee temperature for serving. The first contact operator is the pin 107 which is moved into cooperative relation with the bimetallic blade when the lever 88 is latched, that is, moved to the "high" position described, Figs. 8, 10 and 16. Also, by this movement of the lever 88 the cam member 102 has engaged the cam button 122 and depressed the spring contact arm 109, thereby lowering the pin 124 with respect to the outer end of the bimetallic blade. By this downward movement of the spring 109 the contacts 119—121 are pressed more firmly together. Now, heating of the bimetallic blade will cause its outer end to warp downwardly and engage the first contact operator 107 moving it downwardly and consequently depressing the lever 88 until it is unlatched from the shoulder 98 at a predetermined high temperature, the lever unlatching to the position shown in Figs. 9, 12 and 17. This withdraws the cam member 102 from the cam button 122, thus releasing the spring 109 and allowing it to assume a normal position shown in Figs. 13 and 17. At this point what I term the second contact operator, namely the pin 124, comes into action. By unlatching the lever 88 as described, this second contact operator 124 is brought into coacting engagement with the insulation block 106 of the bimetallic blade which resists the tension of the spring member 111 and holds the contact 121 in the open position. The parts are so proportioned that the switch contacts are maintained open for a predetermined period depending on cooling of the bimetallic blade, during which time period the coffee brewing takes place, as described hereinafter. During this period the coffee is brewed in the upper vessel and the lower vessel is cooling. This time interval is important in that the device serves to automatically control the brewing period. As the lower vessel cools, condensation takes place and after a controlled time period the coffee returns quickly to the lower vessel. It will now be observed that the bimetallic blade is in direct coacting relation with the second contact operator 124 and that it serves to close the contacts 119—121 at a low temperature in response to cooling, as illustrated in Figs. 14 and 15. Because of this operative relation between the bimetallic blade and the second contact operator 124 the contacts 119—121 will be recurrently opened and closed within a predetermined temperature range to maintain the coffee in the pot at a substantially uniform temperature below that at which the liquid is heated under control of the first contact operator. It will also be noted that the first contact operator 107 is actuated only once by the thermostat at a predetermined high temperature in the coffee making process and that the second contact operator 124 is recurrently operated by the same thermostat to maintain the coffee at a lower temperature.

The coffee making operation of the device will best be understood from Figs. 1 and 10 to 18, inclusive. The operator first places the requisite amount of water in the pot 16, then assembles the bowl 17 together with the filter 48 and rod 35 in position on the pot. The indicated amount of ground coffee is then placed in the bowl 17 and, with an appliance cord connecting the terminal pins 112 and 116 to a suitable source of current, the switch button 91 is moved to the position designated by the word "high" inscribed on the outer surface of the base 71, as shown at 126, in which position the lever 88 is engaged behind the shoulder 98. This operation causes the cam member 102 to engage the cam button 122 and move the contacts 119—121 to the closed position shown in Figs. 10, 11 and 16, although it will be observed that in the present embodiment of the invention the heating circuit is normally closed regardless of whether the cam member 102 is in the "high" or the "low" position and that even though said contacts are normally closed current does not flow through the heater circuit until the terminal pins 112—116 are connected to a source of current. In this latched condition the second contact operator 124 is relatively remote from the insulation block 106 on the bimetallic blade and the first contact operator 107 is in closer coacting relation with the bimetallic blade so as to be actuated thereby at a predetermined time in the movement of the bimetallic blade in response to heating.

Current thereupon flows through the heating element, heating the water within the pot 16 and causing the generation of sufficient steam pressure therein to displace all of the water from the pot 16 to the bowl 17 except a small layer of water in the bottom of the well 24. When the water is thus displaced, the bottom of the pot heats rapidly to a relatively high temperature, in this particular instance about 300° F., which high temperature is transmitted to the thermostatic blade 104 through the sleeve 82, causing the same to warp downward in a comparatively quick action sufficiently to engage the first contact operator 107 and force the lever 88 free of the shoulder 98, whereupon the lever 88 moves to the position shown in Figs. 9, 12, 13 and 17, with the cam member 102 free of the button 122. This movement permits the spring blades 109 and 111 to move upward to the position shown in Figs. 12, 13 and 17, during which movement the second contact operator engages the insulation block 106, limiting the upward movement of this spring blade while the spring blade 109 continues its upward movement sufficient to break the contacts 119 and 121. This terminates the flow of current through the heating element and allows the pot to cool to a lower temperature determined by the setting of the screw 124, in this particular instance about 170° F. As the pot cools, the thermostatic blade 104 moves toward its cold position and the screw 124 and spring blade 111 follow. During this movement the contact 121 eventually engages the contact 119 causing current to be again supplied to the heating element 122. The temperature at which this reengagement occurs is determined by the setting of the screw 124.

During this cooling, the steam in the pot 16 at least in part condenses, creating a reduced pressure within the pot which draws the liquid from the bowl 17 back into the pot, the liquid passing through the filter cloth 54 as it returns. The screw 124 is so adjusted that the liquid is all returned to the pot 16 before the heating element 22 is again energized and such that the thermostat blade will make and break the current at a temperature considerably below the boiling point of water. When the contacts 121 and 119 are re-closed, the liquid in the pot is again heated, but upon a small increase in temperature thereof, the thermostatic blade again warps downward, breaking the contacts 119 and 121 to maintain the temperature of the liquid in the pot within a relatively close temperature range, the parts moving between the position shown in Figs. 12 and 13 and the position shown in Figs. 14 and 15. This recurrent make and break operation continues until the supply of current to the coffee maker is terminated, as by removal of the appliance cord from its connection with the source of power or from the terminal pins 112 and 116 or by actuation of a switch.

It will be observed with reference to the foregoing operation that brewing of the coffee takes place when the hot water is in the upper vessel. The parts are so proportioned that the temperature of the brewing liquid never reaches the boiling point. For example, when the liquid in the upper vessel reaches about 208° F. the current to the heater is shut off as described. Because of the mass heat in the structure the liquid remains in the upper vessel during the brewing stage for a controlled time period. Since the heater is shut off at a predetermined temperature, regardless of the quantity of liquid, this shutting off point is the controlled start of the brewing period. As the structure cools condensation takes place in the lower vessel and this function is proportional to several factors, including the amount of brewing liquid and the related temperature conditions. Since the condensation function creates a vacuous condition in the lower vessel the liquid will be drawn down in a comparatively quick action when sufficiently low pressure is reached, thus terminating the brewing period.

After the liquid has returned to the pot 16 the operator may remove the bowl and filter mechanism as heretofore described, shifting the closure 64 from the opening 58 to the opening 19 of the pot. It will be seen that this may be done at any time after the completion of the making operations but need not be done immediately thereafter. In other words, the operator may prepare the coffee maker, connect the current thereto and proceed about other activities, returning to the coffee maker whenever convenient and, if a sufficient length of time has elapsed for completion of the coffee making operations, the coffee will be ready to serve. This means that the operator need not be constantly on the alert to determine when the water has been displaced into the bowl 17, but may allow an almost unlimited time to elapse without in any way affecting the coffee making operation. It is distinguished in this way from prior coffee makers of this type which require a manual operation of the operator when the water has been displaced into the upper bowl to remove the source of heat from the pot and permit the completion of the making operations. Furthermore, at the completion of the making operations the brewed coffee liquor is maintained at a uniform temperature suitable for serving purposes.

It will be observed from the foregoing that the functions of making coffee and maintaining it at a uniform temperature for serving are effected automatically. Also, it will be observed that certain critical factors in coffee making are automatically controlled. For example, the water is raised to a predetermined high temperature in the brewing vessel and is brewed at an ideal temperature which does not reach boiling. The temperature of the water when the coffee brews is always substantially the same, regardless of the number of cups being made. Furthermore, the brewing period is controlled. In other words, regardless of whether 2 cups or 8 cups are being made the structure automatically compensates its timing to effect the desired brewing period for the particular quantity. It follows that the housewife is not required to know how many minutes are required for brewing the coffee, whether one quantity or another, nor is she required to stand watch and perform some manual operation to terminate the brewing period or to prevent the device from repeating the brewing function. Furthermore, it will be observed that with my invention the device automatically continues from the controlled coffee making process to that of maintaining the coffee at the desired temperature for serving. This also is particularly advantageous in that it relieves the housewife of the necessity of watching the coffee making process and thereafter performing some manual operation to keep the coffee at a desired serving temperature. As a result of this invention I am able to make uniformly delicious coffee. Another advantage of my invention is the simplicity of the structure from the viewpoint of economical manufacture considering the functions performed and also from the viewpoint of practicability. One of the features is the use of a single bimetallic blade and electric heating means controlled thereby so associated and coacting with the coffee making structure as to perform the desired control functions in a practical and efficient manner. Another feature is the use of a single electric heating element which operates intermittently as distinguished from continuous heating, and serves by reason of the novel control to effect the desired temperatures for coffee making and also for coffee serving. Another feature is the provision of a thermally responsive control device characterized by a single bimetallic blade arranged for closely following the pot temperature and coacting at different temperature ranges with a first and a second contact operator to perform the several control operations. Another advantage of my invention is found in the construction and arrangement of the bottom of the coffee making pot, particularly in respect of the heating element and its association with the pot for quick heat exchange, also the construction which prevents warping or distortion of the heating element and the bottom of the pot, and also the construction which permits quick and ready installation of the heating element or replacement thereof.

I am aware that numerous alterations and changes may be made in the specific construction disclosed, and I do not wish to be limited except as required by the prior art and the appended claims.

I claim:

1. The combination in a vacuum type coffee maker of a heating pot, a bowl adapted to seat thereon and having a tube for movement of liquid between the pot and the bowl, a heating element in the pot, and thermostat control means therefor comprising cooperating contacts for controlling the circuit through the heating element, thermostat means closely responsive to the temperature of the pot, said contacts being closed to start the coffee making process, and means responsive to the thermostat means for opening said contacts at a predetermined temperature in the coffee making process and for moving said contacts into a different operative relation with said thermostat means for recurrently closing and opening the heater circuit in a temperature range lower than said predetermined temperature to maintain the coffee at a substantially uniform serving temperature.

2. The combination in a vacuum type coffee maker of a heating pot, a bowl adapted to seat thereon and having a tube for movement of liquid between the pot and the bowl, a heating element in the pot, a circuit for the heater including opening and closing contacts and thermostat control means therefor comprising means for maintaining said contacts closed until the liquid is moved from said pot into said bowl, and thermostat means for actuating said control means to open said contacts at a predetermined temperature in the coffee making process and for subsequently recurrently closing and opening said contacts to maintain a predetermined lower temperature in said pot for the return of the liquid thereto and for maintaining the liquid at a temperature suitable for serving.

3. The combination in a vacuum type coffee maker of a heating pot, a bowl adapted to seat thereon and having a tube for movement of liquid between the pot and the bowl, a heating element in the pot, and thermostat control means therefor comprising cooperating contacts for controlling the circuit through the heating element, thermostat means responsive to the temperature of the pot, manually operable means for moving said contacts to a high heating position, and means responsive to said thermostat means for actuating said contacts to terminate said high heating and for moving said contacts to a position operative by said thermostat means at a predetermined lower temperature to maintain the temperature of said pot at a substantially uniform temperature.

4. The combination in a vacuum type coffee maker of a heating pot, a bowl adapted to seat thereon and having a tube for movement of liquid between the pot and the bowl, a heating element in the pot, and thermostat control means therefor comprising cooperating contacts for controlling the circuit through the heating element, thermostat means responsive to the temperature of the pot, manually operated means for latching said cooperating contacts in a high heat position, and means responsive to said thermostat means for releasing said latch means when the liquid moves from the pot into the bowl to open said contacts by latch release and also serving to move said cooperating contacts into operative position with respect to said thermostat means to maintain a predetermined lower temperature within the pot for the return of the liquid thereto and to maintain the liquid at a certain temperature.

5. The combination in a vacuum type coffee maker of a heating pot, a bowl adapted to seat thereon and having a tube for movement of liquid between the pot and the bowl, a heating element in the pot, and thermostat control means therefor comprising cooperating contacts for controlling the circuit through the heating element, thermostat means responsive to the temperature of the pot, a pair of spring pressed contacts for controlling the circuit through said heating element, cam and lever mechanism manually operable to move said contacts out of range of said thermostat mechanism, spring pressed latch means maintaining said contacts in said last mentioned position whereby to energize said heating element to a relatively high temperature to cause the liquid to be displaced from said pot into said bowl, means responsive to the rise in temperature of said pot resulting from such displacement for releasing said latch means to move said contact means into the range of said thermostat means, and adjustable means operative between the thermostat means and said contacts for opening and closing the contacts in response to changes in temperature in the pot to maintain a predetermined lower temperature and thereby permit the return of the liquid from the bowl to the pot and maintain the liquid in the pot at a serving temperature.

6. In a coffee maker, a single electric heater for heating the pot to perform the coffee making operations and to keep the coffee at a lower temperature for serving, a single thermostat arranged to follow the temperature of the pot, and control means responsive to warping of the thermostat at plural temperature ranges, in the first range to shut off the heater when the pot reaches a predetermined high temperature in the brewing operation and the second range to recurrently turn on and off the heater to maintain the coffee at a substantially uniform serving temperature lower than said brewing temperature.

7. In a coffee maker, a single electric heater for heating the pot to perform the coffee making operations and to keep the coffee at a lower temperature for serving, a single thermostat responsive to the temperature of the pot, and control means operative between the thermostat and the heater to provide a plural temperature range control for the heater, the first temperature range serving to shut off the heater when the liquid reaches a predetermined high temperature in the brewing operation and the second serving to recurrently turn on and off the heater to maintain the coffee at a substantially uniform serving temperature lower than said brewing temperature.

8. An automatic coffee maker having an upper and a lower vessel, an electric heater for heating the lower vessel, a circuit for the heater, contacts for opening and closing the circuit, a bimetal thermostat responsive to the temperature of the lower vessel, and means adapted to be actuated by said thermostat for causing the contacts to be opened and closed including a first contact operator and a second contact operator, said means being constructed and arranged in coaction with the thermostat so that the first contact operator is caused to open the contacts when the thermostat is deflected to a predetermined high heat in the coffee making operation and the second contact operator is caused to recurrently close and open the contacts at lower predetermined temperatures of the lower vessel to maintain the coffee in the lower vessel at a desired serving temperature.

9. An automatic vacuum type coffee maker having an upper and a lower vessel, an electric heater for heating the lower vessel, a circuit for the heater, contacts for opening and closing the circuit, the coffee maker being constructed so that the water in the lower vessel will be displaced into the upper vessel by said heating and subsequently will pass downwardly into the lower vessel in a coffee infusion step, and means thermally responsive to a predetermined high temperature of the lower vessel to cause said contacts to be opened when a substantial amount of the water has been displaced to said upper vessel and subsequently responsive to a lower predetermined temperature of the lower vessel to cause said contacts to be recurrently closed and opened to maintain the coffee in the lower vessel at a lower serving temperature.

10. In an automatic coffee maker, an electric heater for heating the pot to perform the coffee making operations and to subsequently keep the coffee at a lower temperature for serving, a circuit for the heater, contacts for opening and closing the circuit, the contacts being closed at the start of a coffee making operation, a thermostat responsive to the temperature of the pot for controlling said coffee making operations and serving temperature, a first contact operator arranged to be actuated by the thermostat at a predetermined high temperature to open said contacts, and a second contact operator arranged to be actuated by said thermostat to recurrently close and open said contacts to maintain said serving temperature.

11. In a vacuum type coffee maker, an electric heater for heating the pot, a single thermostat responsive to the temperature of the pot, and means operative between the thermostat and the heater to control the coffee making operations and to subsequently keep the coffee at a serving temperature including a first switch operator in coaction with the thermostat and adapted to be actuated thereby to open the switch at a predetermined high temperature of the liquid in the coffee brewing operation, a second switch operator normally in inoperative relation with respect to the thermostat, and means for bringing the second switch operator into coaction with the thermostat and rendering the first switch operator inoperative with respect to the thermostat and whereby the second switch operator is actuated by the thermostat to close and open the switch recurrently to maintain the coffee at said uniform temperature.

12. In an automatic coffee maker a vessel for containing first the water and then the brewed coffee, a second vessel into which the water is passed from the first vessel for infusion and from which the coffee returns to the first vessel, an electric heating element for heating the first vessel, an electric circuit for said heating element having an "on" and "off" switch, a thermostat element responsive to temperature of the first vessel, and switch operating means controlled by said thermostat element to switch off the current to the heating element when a predetermined high temperature in the coffee making process is reached and maintaining the switch off for a brewing period, said switch operating means being further operable in response to operation of said thermostat element in a temperature range different from its first described control to recurrently switch the current on and off to maintain the brewed coffee at a serving temperature lower than said predetermined high temperature.

13. In an automatic coffee maker, a vessel for containing first the water and then the brewed coffee, a second vessel into which the water is passed from the first vessel for infusion and from which the coffee returns to the first vessel, an electric heating element for heating the first vessel, a circuit for said heating element, contacts operable for opening and closing the circuit, a thermostat responsive to the temperature of the lower vessel, a first contact operator arranged to be actuated by the thermostat to open the contacts in response to a predetermined high temperature in the coffee making process, and a second contact operator arranged to be subsequently actuated by the thermostat to recurrently close and open the contacts to maintain the coffee in the lower vessel heated to a serving temperature below said predetermined high temperature.

14. An automatic vacuum type coffee maker as set forth in claim 13, including a manually operable member adapted to be set in either a "high" or a "low" heat position, and means providing cooperative relationship between the manually operable member and the first and second contact operators whereby upon movement of said member to the "high" position the first contact member is placed in coactive relation with the thermostat and upon movement of said member to the "low" position the second contact operator is placed in coactive relation with said thermostat.

15. An automatic vacuum type coffee maker as set forth in claim 13, including a manually operable member adapted to be set in either a "high" or a "low" heat position, and means providing cooperative relationship between the manually operable member and the first and second contact operators whereby upon movement of said member to the "high" position the first contact member is placed in coactive relation with the thermostat, means for latching the manually operable member in said "high" position, the first contact operator causing said manually operable member to be unlatched when said contact operator is actuated, and said manually operable member moving to said "low" position when unlatched and thereby causing the second contact operator to be brought into coactive relation with the thermostat.

16. An automatic vacuum type coffee maker as set forth in claim 13, in which the thermostat is in the form of a bimetallic blade having good thermal connection at one end directly to the bottom of the lower vessel so as to closely follow the temperature thereof, and in which the heating element conforms with the shape of the bottom of the pot and has close thermal connection therewith.

17. In an automatic coffee maker, a vessel for containing first the water and then the brewed coffee, a second vessel into which the water is passed from the first vessel for infusion and from which the coffee returns to the first vessel, an electric heater in quick heat exchange relation with the bottom of the first vessel, an electric circuit for said heater, contacts operable for opening and closing the circuit, a bimetallic thermostat arranged to be closely responsive to the temperature of the lower vessel bottom, and contact control means arranged to be actuated by the thermostat to open the contacts in response to a predetermined high temperature in the coffee making process and to be subsequently actuated by the thermostat in a temperature range different from that of the first mentioned actuation to recurrently close and open the contacts to maintain the coffee in the lower vessel heated to a serving temperature below said predetermined high temperature.

18. In a coffee maker, a pot provided with an annular bottom portion dished downwardly toward the center and having a well at said center, the peripheral portion of said well being threaded, said bottom portion having at its marginal edge an annular depending wall threaded on its inner side, an electric heating element shaped to conform to the dished shape of said bottom and adapted to seat against the underside of said dished portion in the space between said threaded portions, and clamping rings threadingly engaged on said well portion and said marginal wall portion, respectively, and adapted to be tightened against the underside of the heating element to clamp it against said dished bottom portion.

19. In a coffee maker, a heating pot, a bowl adapted to seat thereon and having a tube for movement of liquid between the pot and the bowl, a heating element in the pot, a stud fixed to the bottom of the pot, the stud having a part extending upwardly into said tube and having also a part depending below the bottom of the pot, means disposed within said tube and operative between the bowl and said upstanding stud part to detachably fasten the bowl to the pot, and thermostat means mounted on the depending part of the stud responsive to the temperature of the pot for controlling the heating element.

20. A coffee maker comprising a lower chamber and an upper chamber, a tube connecting said chambers, a heating circuit disposed adjacent said lower chamber, switch means for said heating circuit, and a flat thermo-responsive element normally positioned to be responsive to heat from said lower chamber and having one end fixed to said lower chamber and its other end free and adapted upon movement in one direction to maintain said circuit closed for a predetermined period of time and then open said circuit, and to again close said circuit after a predetermined movement in the other direction.

21. A coffee maker comprising a lower chamber and an upper chamber, a tube connecting said chambers, a heating circuit disposed adjacent said lower chamber, a switch for said heating circuit, and thermo-responsive means normally positioned to be responsive to heat from said lower chamber and adapted upon movement in one direction to actuate said switch to open said circuit at a predetermined high temperature and upon movement in opposite directions in a lower temperature range to recurrently close and open said circuit.

22. A coffee maker comprising a lower chamber and an upper chamber, a tube connecting said chambers, a heating circuit disposed adjacent to said lower chamber, and switch means for opening and closing said heating circuit including a thermal-responsive member positioned to be responsive to heat from said lower chamber, the switch means constructed and arranged to open and close the heating circuit in response to movement of the thermal-responsive member, in a cycle comprising opening the heating circuit when the thermal-responsive member reaches a predetermined high temperature and recurrently closing and opening the heating circuit at a lower temperature range of movement of the thermal-responsive member.

23. A coffee maker having an electric heater and a thermal switch for providing a high temperature for coffee making and a low temperature for serving, the thermal switch having contact means for opening and closing a circuit through the heater and having a bimetallic member responsive to the heater temperatures, the contact means and bimetallic member constructed and arranged so that the bimetallic member is effective in response to temperature changes to cause opening of the heater circuit at a predetermined high temperature of said member for said coffee making and subsequently to cause recurrent closing and opening of the heater circuit at a lower temperature range of said member for said serving.

24. A coffee maker having an electric heater and a thermal switch effective in a sequence of operations to provide a high temperature for coffee making and a low temperature for serving, the thermal switch having a bimetallic member and means coacting therewith to control a circuit through the heater, the bimetallic member effective when heated to a predetermined high temperature to open the heater circuit as a step in controlling the time of the coffee making operation and effective when cooled to a predetermined lower temperature to recurrently close and open the heater circuit to provide said low temperature for serving.

25. A coffee maker having an electric heater and a thermal switch for providing a high temperature for brewing and a low temperature for serving, the thermal switch having contact means normally closing a circuit through the heater and operable in a sequence of operations consisting of opening the circuit when a predetermined high temperature is reached and recurrently closing and opening the circuit in a lower temperature range, and a bimetallic member responsive to temperatures generated by the heater, the bimetallic member and contact means being co-ordinated in said sequence of operations to maintain the contact means ineffective to open the heater circuit when the bimetallic member is deflected from the normal cold condition through said low temperature range to said high temperature and effective to recurrently open and close the circuit only after the bimetallic member has caused the circuit to be opened at said predetermined high temperature.

26. A coffee maker having an electric heater and a thermal switch for providing a high temperature for brewing and a low temperature for serving, the thermal switch having a pair of contacts for closing and opening a circuit through the heater, a spring member carrying one of said contacts and biased to close the contacts, an adjustable pin on said spring member providing a contact member, means movable in response to temperature of the heater including a bimetallic member and a contact member thereon adapted to coact with said adjustable contact member to open and close said contacts in response to movement of the bimetallic member in a predetermined low temperature range for providing said low temperature, and means in co-operative relation with the bimetallic member to cause said circuit to remain closed during movement of the bimetallic member from a normal cold condition to a predetermined high temperature higher than said low temperature range and to cause said heater circuit to be opened at said predetermined high temperature and subsequently to cause said contacts to be recurrently closed and opened by direct coaction between said contact members, adjustment of said member serving to vary the said low temperature.

IVAR JEPSON.

CERTIFICATE OF CORRECTION.

Patent No. 2,312,555. March 2, 1943.

IVAR JEPSON.

It is hereby certified that error appears in the printed specification of the above numbered patent requiring correction as follows: Page 6, second column, line 4, claim 4, before "latch release" insert --said--; and line 62, claim 7, strike out "liquid" and insert --pot--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.